US011268000B2

(12) United States Patent
Doisneau et al.

(10) Patent No.: US 11,268,000 B2
(45) Date of Patent: *Mar. 8, 2022

(54) AQUEOUS ADHESIVE COMPOSITION COMPRISING A ITHERMOSETTING RESIN

(71) Applicant: COMPAGNIE GENERALE DES ETABLISSEMENTS MICHELIN, Clermont-Ferrand (FR)

(72) Inventors: David Doisneau, Clermont-Ferrand (FR); Clement Michoud, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 164 days.

This patent is subject to a terminal disclaimer.

(21) Appl. No.: 16/090,423

(22) PCT Filed: Apr. 3, 2017

(86) PCT No.: PCT/FR2017/050778
§ 371 (c)(1),
(2) Date: Oct. 1, 2018

(87) PCT Pub. No.: WO2017/168109
PCT Pub. Date: Oct. 5, 2017

(65) Prior Publication Data
US 2019/0112512 A1  Apr. 18, 2019

(30) Foreign Application Priority Data

Apr. 1, 2016 (FR) ........................................ 1652894

(51) Int. Cl.
| | | |
|---|---|---|
| *C09J 161/12* | (2006.01) |
| *C08G 8/04* | (2006.01) |
| *C09J 5/00* | (2006.01) |
| *C09J 161/06* | (2006.01) |
| *B27N 3/00* | (2006.01) |
| *D06M 15/41* | (2006.01) |
| *C09J 5/02* | (2006.01) |
| *C09J 171/14* | (2006.01) |

(52) U.S. Cl.
CPC ............ *C09J 161/12* (2013.01); *B27N 3/002* (2013.01); *C08G 8/04* (2013.01); *C09J 5/00* (2013.01); *C09J 5/02* (2013.01); *C09J 161/06* (2013.01); *C09J 171/14* (2013.01); *D06M 15/41* (2013.01); *C09J 2400/303* (2013.01); *C09J 2461/00* (2013.01)

(58) Field of Classification Search
CPC ......... C09J 161/06; C09J 161/12; C08G 8/04; C08G 8/06; C08L 61/12
See application file for complete search history.

(56) References Cited

U.S. PATENT DOCUMENTS

| | | | |
|---|---|---|---|
| 2,360,376 A | 10/1944 | Van Epps | |
| 2,561,215 A | 7/1951 | Mighton | |
| 2,776,948 A * | 1/1957 | Snyder | ..................... C08G 8/06 528/155 |
| 3,817,778 A | 6/1974 | Wright | |
| 4,474,636 A * | 10/1984 | Bogner | ................ C08K 5/1535 156/307.3 |
| 5,006,443 A * | 4/1991 | Muller | ...................... C08F 8/18 430/175 |
| 9,840,644 B2 | 12/2017 | Doisneau et al. | |
| 9,938,434 B2 | 4/2018 | Doisneau | |
| 10,005,929 B2 | 6/2018 | Doisneau et al. | |
| 10,040,976 B2 | 8/2018 | Doisneau et al. | |
| 10,047,255 B2 | 8/2018 | Doisneau | |
| 2008/0125517 A1 | 5/2008 | Clingerman et al. | |
| 2008/0207796 A1* | 8/2008 | Clingerman | ......... C08G 18/542 523/144 |
| 2014/0235124 A1 | 8/2014 | Doisneau et al. | |
| 2016/0024353 A1 | 1/2016 | Doisneau | |
| 2016/0251550 A1* | 9/2016 | Michoud | .................. C08G 8/00 428/221 |
| 2016/0355631 A1 | 12/2016 | Xu et al. | |
| 2017/0165942 A1 | 6/2017 | Michoud et al. | |
| 2017/0166010 A1 | 6/2017 | Michoud et al. | |

(Continued)

FOREIGN PATENT DOCUMENTS

| | | |
|---|---|---|
| JP | 3361819 B2 | 1/2003 |
| WO | 2013/017421 A1 | 2/2013 |

(Continued)

OTHER PUBLICATIONS

International Search Report dated Jun. 26, 2017, in corresponding PCT/FR2017/050778 (7 pages).

Primary Examiner — Michael M Dollinger
(74) Attorney, Agent, or Firm — Venable LLP

(57) ABSTRACT

An aqueous adhesive composition comprises a thermosetting resin based on: at least one aromatic compound bearing at least two functions, one of these functions being a hydroxymethyl function and the other being an aldehyde function or a hydroxymethyl function, the aromatic compound comprising at least one aromatic ring; and at least aromatic polyphenol comprising at least one aromatic ring bearing at least two hydroxyl functions in the meta position relative to one another, the two positions ortho to at least one of the hydroxyl functions being unsubstituted. Such an adhesive composition may especially be used to join elements made of wood; it constitutes an advantageous alternative to the use of a formaldehyde-based phenolic resin adhesive.

21 Claims, No Drawings

(56) References Cited

U.S. PATENT DOCUMENTS

| | | |
|---|---|---|
| 2017/0166011 A1 | 6/2017 | Michoud et al. |
| 2017/0174006 A1 | 6/2017 | Michoud et al. |
| 2018/0118983 A1 | 5/2018 | Doisneau et al. |
| 2019/0119535 A1 | 4/2019 | Doisneau |

FOREIGN PATENT DOCUMENTS

| | | |
|---|---|---|
| WO | 2014/118163 A2 | 8/2014 |
| WO | 2015/007641 A1 | 1/2015 |
| WO | 2015/123781 A1 | 8/2015 |

\* cited by examiner

AQUEOUS ADHESIVE COMPOSITION COMPRISING A ITHERMOSETTING RESIN

BACKGROUND

The field of the present invention relates to aqueous adhesive compositions intended to cause elements to adhere, to the use and the process for producing such a composition, the process for assembling elements by means of these compositions and also the assemblies manufactured using these compositions.

Phenoplasts or "phenol-formaldehyde resins" (acronym PF) are derived from formaldehyde and phenol. Since phenol is a molecule having several reactive sites, a three-dimensional network is ultimately formed. Phenoplasts are especially used as adhesives, for example for the manufacture of pressed woods or of composite materials reinforced with glass fibres, textiles fibres, etc.

In the field of wood, a phenol/aldehyde type composition is described in U.S. Pat. No. 2,360,376. This composition comprises a phenol/aldehyde resin based on formaldehyde and phenol. The molar ratio of formaldehyde to phenol is within a range of values extending from 2 to 3.5. This composition is used in a process for the adhesive bonding of plywood articles comprising several wooden plies. During this process, one or more plies is/are coated with a layer of the composition, the plies are joined to one another via the layer of composition and the plies, thus joined, are cured under pressure. The adhesively bonded assembly thus obtained has high cohesion by virtue of the excellent adhesive properties of the composition.

However, the use of formaldehyde, which furthermore is in excess relative to the phenol, results in the release of formaldehyde, not only during the curing under pressure but also during the storage and the use of the adhesively bonded assembly. Due to recent changes in regulations, especially in European regulations regarding this type of compound, it is desirable to limit as much as possible, or even to eliminate, the use of formaldehyde or formaldehyde precursor.

The aim of the invention is to provide an aqueous adhesive composition comprising a thermosetting resin, having elevated adhesive properties and being devoid of formaldehyde.

During their research, the Applicants have discovered an aqueous adhesive composition not using free formaldehyde which makes it possible to meet the above objective.

In their application WO2014/118163, the Applicants proposed aqueous adhesive compositions for the adhesive bonding of wood comprising on the one hand a phenol/aldehyde resin and less than 16% by weight of unsaturated diene elastomer latex.

The phenol/aldehyde resin is based on at least one aromatic polyaldehyde and at least one aromatic polyphenol. The presence of two aldehyde functions on the polyaldehyde is an essential characteristic that is necessary to ensure sufficient adhesive bonding.

The adhesive compositions described therein constitute a highly beneficial alternative to the use of conventional phenolic resin adhesives.

However, the phenol/aldehyde resins described therein are sparingly water-soluble and require especially vigorous stirring during the addition thereof to the aqueous composition. This vigorous stirring requires costly apparatus and increases the duration of the process.

There is therefore a need for other alternative thermosetting resins which could effectively replace phenolic resin adhesives.

SUMMARY

Thus, a first subject of the invention relates to an aqueous adhesive composition comprising A) a thermosetting resin based on:

A1) at least one aromatic compound comprising at least one aromatic ring bearing at least two functions, one of these functions being a hydroxymethyl function and the other being an aldehyde function or a hydroxymethyl function; and A2) at least one aromatic polyphenol comprising at least one aromatic ring bearing at least two hydroxyl functions in the meta position relative to one another, the two positions ortho to at least one of the hydroxyl functions being unsubstituted.

In a variant, the aqueous adhesive composition comprises less than 16% by weight of unsaturated diene elastomer latex.

Another subject of the invention relates to an aqueous adhesive solution comprising a pre-condensed thermosetting resin based on:

A1) at least one aromatic compound comprising at least one aromatic ring bearing at least two functions, one of these functions being a hydroxymethyl function and the other being an aldehyde function or a hydroxymethyl function; and A2) at least one aromatic polyphenol comprising at least one aromatic ring bearing at least two hydroxyl functions in the meta position relative to one another, the two positions ortho to at least one of the hydroxyl functions being unsubstituted.

Another subject of the invention relates to the use of the aqueous adhesive composition according to the invention or of the aqueous adhesive solution according to the invention, for the adhesive bonding of two elements, especially of two elements made of wood.

The invention also relates to a process for adhesively bonding two elements wherein:
a layer of the aqueous adhesive composition as defined above is applied to at least one of the two elements, and
the two elements are joined to one another via the layer of the aqueous adhesive composition.

The invention also relates to an adhesively bonded assembly of two elements comprising a layer of the aqueous adhesive composition as defined above joining the two elements to one another.

The invention and its advantages will be easily understood in the light of the following description.

DETAILED DESCRIPTION

I—FORMULATION OF THE AQUEOUS ADHESIVE COMPOSITION

In the present description, unless expressly indicated otherwise, all the percentages (%) shown are % by weight.

"Meta position relative to one another" is intended to mean that the functions in question, for example the hydroxyl functions in the aromatic polyphenol, are borne by carbons of the aromatic ring which are separated from one another by a single other carbon of the aromatic ring.

"Para position relative to one another" is intended to mean that the functions in question are opposite one another, that is to say in positions 1 and 4 of the 6-membered aromatic ring. Similarly, "the para position" relative to a function is a position opposite the function on the 6-membered aromatic ring bearing the function.

"Position ortho to a function" is intended to mean the position occupied by the carbon of the aromatic ring which is immediately adjacent to the carbon of the aromatic ring bearing the function. Similarly, "the ortho position" relative to a function is the position adjacent to the function on the aromatic ring bearing the function.

A "member" of a ring is intended to mean an atom constituting the backbone of the ring. Thus, for example, a benzene ring comprises six members, each member consisting of a carbon atom. In another example, a furan ring comprises five members, four members each consisting of a carbon atom and the remaining member consisting of an oxygen atom.

"CHO" represents the aldehyde function.

"CH$_2$OH" represents the hydroxymethyl function.

"Compound A1" denotes, within the context of the invention, the aromatic compound defined in paragraph I.1.

"Compound A2" denotes, within the context of the invention, the compound based on aromatic polyphenol defined in paragraph I2.

"Compound A2'" denotes, within the context of the invention, the compound based on aromatic monophenol defined in paragraph I.2.

"Aromatic polyphenol" is intended to mean an aromatic compound comprising at least one benzene ring bearing more than one hydroxyl function.

"Diene" elastomer (or, without distinction, rubber) is intended to mean an elastomer resulting at least in part (that is to say, a homopolymer or a copolymer) from diene monomer(s) (i.e., monomers bearing two conjugated or non-conjugated carbon-carbon double bonds). "Isoprene elastomer" is intended to mean an isoprene homopolymer or copolymer, in other words a diene elastomer selected from the group consisting of natural rubber (NR), synthetic polyisoprenes (IRs), various isoprene copolymers and the mixtures of these elastomers.

Within the context of the invention, the carbon-based products mentioned in the description may be of fossil or biobased origin. In the latter case, they may partially or completely result from biomass or be obtained from renewable starting materials resulting from biomass.

Furthermore, any range of values denoted by the expression "between a and b" represents the range of values extending from more than a to less than b (that is to say, limits a and b excluded), while any range of values denoted by the expression "from a to b" means the range of values extending from a up to b (that is to say, including the strict limits a and b).

The expression "composition based on" should, of course, be understood as meaning a composition comprising the mixture and/or the reaction product of the various base constituents used for this composition, it being possible for some of them to be intended to react or capable of reacting with one another or with their immediate chemical surroundings, at least partly, during the various phases of manufacture of the composition, of the textile material or of the composites or finished articles comprising such composites, in particular during a curing step.

The aqueous adhesive composition according to the invention thus comprises at least one (that is to say one or more) thermosetting resin according to the invention, this thermosetting resin is, for its part, based on at least one (that is to say one or more) aromatic compound and at least one (that is to say one or more) aromatic polyphenol, which constituents will be described in detail below.

I.1—Aromatic Compound A1

The first essential constituent of the thermosetting resin is an aromatic compound comprising at least one aromatic ring bearing at least two functions, one of these functions being a hydroxymethyl function and the other being an aldehyde function or a hydroxymethyl function. Thus, in accordance with the invention, it is said aromatic ring which bears hydroxymethyl and aldehyde functions. The compound according to the invention therefore corresponds to the general formula (I):

wherein Ar represents an aromatic ring and B represents CHO or CH$_2$OH.

The aromatic ring is advantageously a 5- or 6-membered ring comprising, as members, carbon atoms and optionally one or more heteroatoms, in particular nitrogen, oxygen or sulfur atoms, optionally oxidized in N-oxide or S-oxide form. In one variant, the aromatic ring comprises 0, 1 or 2 heteroatom(s). The remainder of the aromatic ring may be substituted or unsubstituted.

The aromatic ring may bear 0, 1 or 2 aldehyde functions, advantageously 0 or 1 aldehyde function.

The aromatic ring may bear 1, 2 or 3 hydroxymethyl functions, advantageously 1 or 2 hydroxymethyl functions.

In addition, the aromatic ring may also bear 0, 1 or 2 other function(s), in particular hydroxyl.

In the embodiment in which the aromatic ring is a 6-membered ring, the B and hydroxymethyl functions are advantageously in the meta or para position relative to one another.

In the embodiment in which the aromatic ring is a 5-membered ring, the ring may comprise one or more heteroatoms, in particular nitrogen, oxygen or sulfur atoms, optionally oxidized in N-oxide or S-oxide form. Advantageously, the aromatic ring comprises 1 or 2 heteroatom(s), preferably 1 heteroatom.

In this embodiment, in which the aromatic ring is a 5-membered ring, at least one of the three following conditions is met:
 the aromatic ring comprises 0 or a single aldehyde function;
 the aromatic ring comprises one or two hydroxymethyl functions;
 aside from the aldehyde and hydroxymethyl functions, the remainder of the aromatic ring is unsubstituted.

Advantageously, these three conditions are met.

In a first case, the aromatic ring comprises
 a single aldehyde function;
 a single hydroxymethyl function;
 aside from the aldehyde and hydroxymethyl functions, the remainder of the aromatic ring is unsubstituted.

In a second case, the aromatic ring comprises
 0 aldehyde functions;
 two hydroxymethyl functions;
 aside from the hydroxymethyl functions, the remainder of the aromatic ring is unsubstituted.

Advantageously, the compound is of general formula (II):

in which B represents CHO or CH$_2$OH, X represents O, NR$_1$, NO, S, SO, SO$_2$, SR$_2$R$_3$, R$_1$ represents a hydrogen, an alkyl, aryl, arylalkyl, alkylaryl or cycloalkyl group, R$_2$, R$_3$ each represent, independently of one another, a hydrogen, an alkyl, aryl, arylalkyl, alkylaryl or cycloalkyl group.

Advantageously, the compound is of general formula (II'):

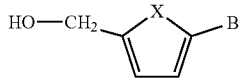

(II')

in which X and B are as defined above.

According to a particularly advantageous embodiment, B represents CHO. In another embodiment, B represents CH$_2$OH.

According to a preferential embodiment, X represents O.

In one variant, the compound is of formula (IIa):

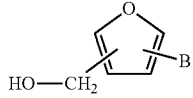

(IIa)

B being as defined above
and more particularly of formula (II'a1) or (II'a2):

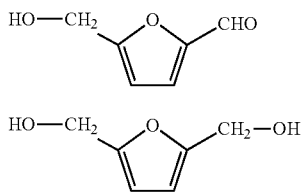

(II'a1)

(II'a2)

5-(Hydroxymethyl)furfural (II'a1) is a particularly suitable aldehyde, given that this organic compound can be readily derived from renewable resources. Indeed, it is derived especially from the dehydration of certain sugars such as fructose, glucose, sucrose, cellulose and inulin.

In another embodiment, X represents NR$_1$ or NO, advantageously NR$_1$. R$_1$ is as defined above.

In one variant, the compound is of formula (IIb):

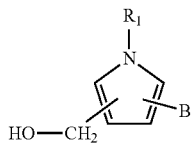

(IIb)

B being as defined above
and more particularly of formula (II'b1) or (II'b2):

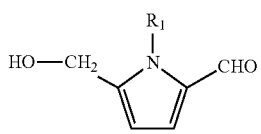

(II'b1)

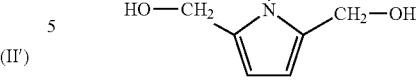

(II'b2)

in which R$_1$ represents a hydrogen, an alkyl, aryl, arylalkyl, alkylaryl or cycloalkyl group. Advantageously, R$_1$ represents a hydrogen or a C$_1$-C$_6$ alkyl group.

In another embodiment, X represents S, SO, SO$_2$ or SR$_2$R$_3$.

In one variant, the compound is of formula (IIc):

B being as defined above

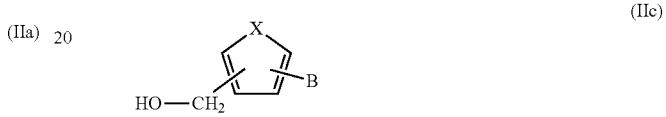

(IIc)

where X represents S, SR$_2$R$_3$, SO, SO$_2$, R$_2$, R$_3$ each represent, independently of one another, a hydrogen, an alkyl, aryl, arylalkyl, alkylaryl or cycloalkyl group, B being as defined above;

and more particularly of formula (II'c1) or (II'c2):

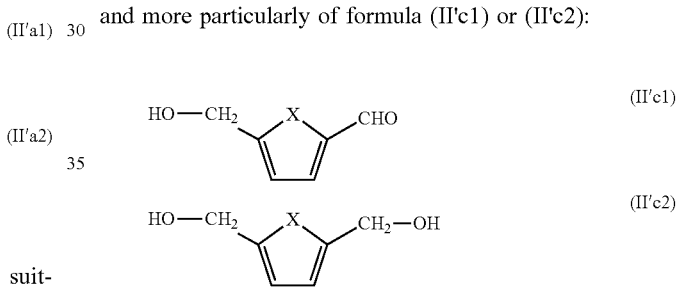

(II'c1)

(II'c2)

in which X represents S, SR$_2$R$_3$, SO, SO$_2$, R$_2$, R$_3$ each represent, independently of one another, a hydrogen, an alkyl, aryl, arylalkyl, alkylaryl or cycloalkyl group.

The compound may thus be:

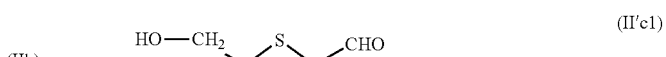

(II'c1)

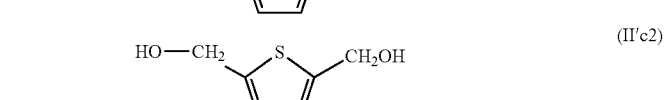

(II'c2)

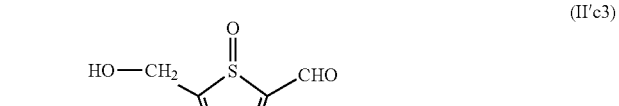

(II'c3)

(II'c4)

-continued

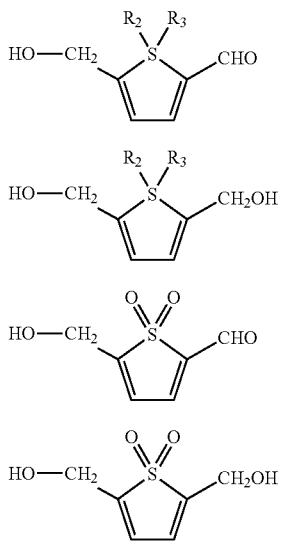

Advantageously, $R_2$ and $R_3$ each represent, independently of one another, a $C_1$-$C_6$ alkyl radical.

The compound is advantageously of formula (II'c1) or (II'c2).

In another variant, the aromatic ring is a 6-membered ring, possibly comprises 0, one or more heteroatoms, in particular nitrogen, optionally oxidized in N-oxide form. In one variant, the aromatic ring comprises 0, 1 or 2 heteroatom(s).

The B and hydroxymethyl functions are advantageously in the meta or para position relative to one another.

The aromatic ring may bear 0, 1 or 2 aldehyde functions, advantageously 0 or 1 aldehyde function.

The aromatic ring may bear 1, 2 or 3 hydroxymethyl functions, advantageously 1 or 2 hydroxymethyl functions.

In addition, the aromatic ring may also bear 0, 1 or 2 other function(s), in particular hydroxyl.

Advantageously, the compound is of general formula (III):

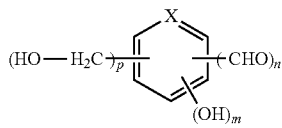

in which X represents C or $NR_1$, n is 0, 1 or 2, m is 0 or 1, p is 1, 2 or 3. $R_1$ represents a hydrogen, an alkyl, aryl, arylalkyl, alkylaryl or cycloalkyl group. In accordance with the invention, p+n>1 with p>0.

Advantageously, $R_1$ represents a hydrogen or a $C_1$-$C_6$ alkyl group.

In one variant, n is 1, m is 0 and p is 1.
In another variant, n is 1, m is 1 and p is 1.
In another variant, n is 2, m is 1 and p is 1.
In another variant, n is 1, m is 1 and p is 2.
In another variant, n is 0, m is 0 and p is 2.
In another variant, n is 0, m is 1 and p is 2.
In another variant, n is 1, m is 1 and p is 2.
In another variant, n is 0, m is 1 and p is 3.

Preferentially, the aromatic ring of the aldehyde is a benzene ring. More preferentially, this aldehyde is selected from the group consisting of 2-hydroxymethylbenzene-1-carboxaldehyde, 3-hydroxymethylbenzene-1-carboxaldehyde, 4-hydroxymethylbenzene-1-carboxaldehyde, 3-hydroxymethyl-6-hydroxybenzene-1-carboxaldehyde, 3-hydroxymethyl-4-hydroxybenzene-1-carboxaldehyde, 3-hydroxymethyl-2-hydroxybenzene-1-carboxaldehyde, 3-hydroxymethyl-2-hydroxybenzene-1,5-dicarboxaldehyde, 5-hydroxymethyl-2-hydroxybenzene-1,3-dicarboxaldehyde, 3,5-hydroxymethyl-4-hydroxybenzene-1-carboxaldehyde, 3,5-hydroxymethyl-2-hydroxybenzene-1-carboxaldehyde, 1,2-hydroxymethylbenzene, 1,3-hydroxymethylbenzene, 1,4-hydroxymethylbenzene, 1,3-hydroxymethyl-6-hydroxybenzene, 1,3-hydroxymethyl-4-hydroxybenzene, 1,3-hydroxymethyl-2-hydroxybenzene, 1,3,5-hydroxymethyl-2-hydroxybenzene, 1,3-hydroxymethyl-6-hydroxybenzene, 1,3,5-hydroxymethyl-4-hydroxybenzene, 1,3,2-hydroxymethyl-2-hydroxybenzene and the mixtures of these compounds.

Even more preferentially, the aromatic compound used is 1-hydroxymethylbenzene-4-carboxaldehyde of formula (IIIa) or 1,4-hydroxymethylbenzene of formula (IIIb):

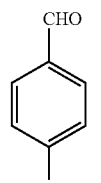

(IIIa)

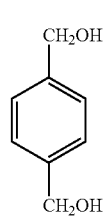

(IIIb)

Preferably, when the thermosetting resin is based on polyphenol and on one or more compounds of formula (I), the composition is devoid of formaldehyde.

When the thermosetting resin is based on polyphenol, on one or more compounds of formula (I) and on aldehydes, each aldehyde is preferentially other than formaldehyde. The composition is then also devoid of formaldehyde.

In other words and preferably, when an aldehyde is present, the or each aldehyde of the thermosetting resin is other than formaldehyde.

Devoid of formaldehyde is intended to mean that the content by weight of formaldehyde by total weight of the aldehyde(s) is less than or equal to 10%, preferably to 5% and more preferentially to 2%, these percentages corresponding to traces liable to be present in the aldehyde(s) used industrially.

I.2—Aromatic Polyphenol and/or Aromatic Monophenol—Compounds A2 and/or A2'

In one embodiment, the second essential constituent of the thermosetting resin is an aromatic polyphenol A2 comprising one or more aromatic ring(s). The aromatic polyphenol comprises at least one aromatic ring bearing at least two hydroxyl functions in the meta position relative to one another, the two positions ortho to at least one of the hydroxyl functions being unsubstituted.

In another embodiment, the second essential constituent is a mixture of the aromatic polyphenol A2 as described above and aromatic monophenol A2' comprising at least one six-membered aromatic ring bearing a single hydroxyl function. On this aromatic monophenol, the two positions ortho to the hydroxyl function are unsubstituted, or else at least one position ortho to and the position para to the hydroxyl function are unsubstituted.

Thus, in this embodiment, the thermosetting resin according to the invention is also based on:

A2') at least one aromatic monophenol comprising at least one six-membered aromatic ring bearing a single hydroxyl function,
    the two positions ortho to the hydroxyl function being unsubstituted, or
    at least one position ortho to and the position para to the hydroxyl function being unsubstituted.

In accordance with the invention, the compound A2) may be, in one embodiment, a simple aromatic polyphenol molecule comprising one or more aromatic rings, at least one of these aromatic rings, or even each aromatic ring, bearing at least two hydroxyl functions in the meta position relative to one another, the two positions ortho to at least one of the hydroxyl functions being unsubstituted.

Similarly, the compound A2') may be, in one embodiment, a simple aromatic monophenol molecule comprising one or more six-membered aromatic rings, at least one of these six-membered aromatic rings, or even each six-membered aromatic ring, bearing a single hydroxyl function, the two positions ortho to the hydroxyl function are unsubstituted, or else at least one position ortho to and the position para to the hydroxyl function are unsubstituted.

Such simple molecules do not comprise a repeat unit.

In accordance with the invention, the compound A2) may be, in another embodiment, a pre-condensed resin based:
    on at least one aromatic polyphenol comprising at least one aromatic ring bearing at least two hydroxyl functions in the meta position relative to one another, the two positions ortho to at least one of the hydroxyl functions being unsubstituted; and
    on at least one compound capable of reacting with said aromatic polyphenol comprising at least one aldehyde function and/or at least one compound capable of reacting with said aromatic polyphenol comprising at least two hydroxymethyl functions borne by an aromatic ring.

Such a pre-condensed resin based on aromatic polyphenol is in accordance with the invention and comprises, unlike the simple molecule described above, a repeat unit. In this instance, the repeat unit comprises at least one aromatic ring bearing at least two hydroxyl functions in the meta position relative to one another.

Similarly and in accordance with the invention, the compound A2') may be, in another embodiment, a pre-condensed resin based on:
    at least one aromatic monophenol comprising at least one six-membered aromatic ring bearing a single hydroxyl function:
        the two positions ortho to the hydroxyl function are unsubstituted, or
        at least one position ortho to and the position para to the hydroxyl function are unsubstituted;
    at least one compound capable of reacting with said aromatic monophenol comprising at least one aldehyde function and/or at least one compound capable of reacting with said aromatic monophenol comprising at least two hydroxymethyl functions borne by an aromatic ring.

Such a pre-condensed resin based on aromatic monophenol is in accordance with the invention and comprises, unlike the simple molecule described above, a repeat unit. In this instance, the repeat unit comprises at least one six-membered aromatic ring bearing a single hydroxyl function.

In another embodiment, the compound A2) and/or A2') is a mixture of an aromatic polyphenol that forms a simple molecule and of a pre-condensed resin based on aromatic polyphenol.

In the following particular embodiments, the aromatic ring(s) of the aromatic polyphenol and/or of the aromatic monophenol are described. For the sake of clarity, the "aromatic polyphenol" and/or the "aromatic monophenol" is described therein in its simple molecule form. This aromatic polyphenol and/or this aromatic monophenol will then be able to be condensed and will in part define the repeat unit. The characteristics of the pre-condensed resin are described in greater detail below.

Aromatic Polyphenol A2

In a preferred embodiment, the aromatic ring of the aromatic polyphenol bears three hydroxyl functions in the meta position relative to one another.

The two positions ortho to each hydroxyl function are preferably unsubstituted. This is intended to mean that the two carbon atoms located on either side of (in the position ortho to) the hydroxylated carbon atom (i.e. that which bears the hydroxyl function) just bear a hydrogen atom.

Even more preferentially, the remainder of the aromatic ring is unsubstituted. This is intended to mean that the other carbon atoms of the remainder of the aromatic ring (those other than the carbon atoms bearing hydroxyl functions) just bear a hydrogen atom.

In one embodiment, the aromatic polyphenol comprises several aromatic rings, at least two of these each bearing at least two hydroxyl functions in the meta position relative to one another, the two positions ortho to at least one of the hydroxyl functions of at least one aromatic ring being unsubstituted.

In a preferred embodiment, at least one of the aromatic rings of the aromatic polyphenol bears three hydroxyl functions in the meta position relative to one another.

The two positions ortho to each hydroxyl function of at least one aromatic ring are preferably unsubstituted.

Even more preferentially, the two positions ortho to each hydroxyl function of each aromatic ring are unsubstituted.

Even more preferentially, the remainder of each of the aromatic rings is unsubstituted. This is intended to mean that the other carbon atoms of the remainder of each aromatic ring (those other than the carbon atoms bearing hydroxyl functions or bearing groups that attach the aromatic rings to one another) just bear a hydrogen atom.

Advantageously, the aromatic ring bearing at least two hydroxyl functions in the meta position relative to one another, the two positions ortho to at least one of the hydroxyl functions being unsubstituted, is a benzene ring.

Advantageously, each aromatic ring of the aromatic polyphenol is a benzene ring.

Mention may in particular be made, as example of aromatic polyphenol comprising just one aromatic ring, of resorcinol and phloroglucinol, as a reminder of expanded formulae (IV) and (V), respectively:

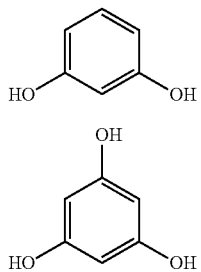

(IV)

(V)

By way of examples, in the case in which the aromatic polyphenol comprises several aromatic rings, at least two of these aromatic rings, which are identical or different, are selected from those of general formulae:

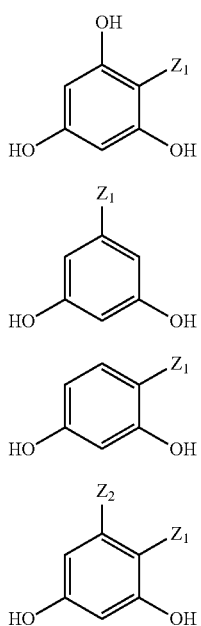

(VI-a)

(VI-b)

(VI-c)

(VI-d)

in which the $Z_1$ and $Z_2$ symbols, which are identical or different, if there are several of them on the same aromatic ring, represent an atom (for example, carbon, sulfur or oxygen) or a connecting group, by definition at least divalent, which connects at least these two aromatic rings to the remainder of the aromatic polyphenol.

Another example of aromatic polyphenol is 2,2',4,4'-tetrahydroxydiphenyl sulfide of the following expanded formula (VII):

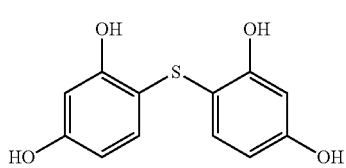

(VII)

Another example of aromatic polyphenol is 2,2',4,4'-tetrahydroxydiphenyl benzophenone of the following expanded formula (VIII):

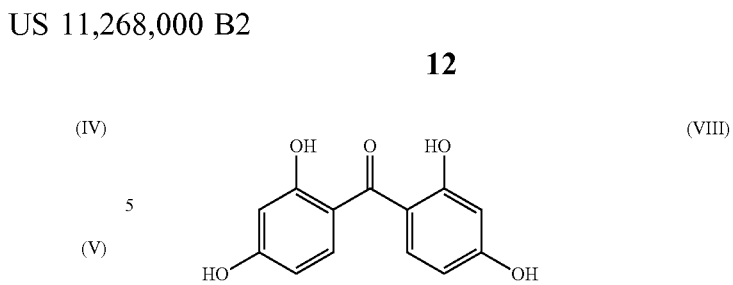

(VIII)

It is noted that each compound VII and VIII is an aromatic polyphenol comprising two aromatic rings (of formulae VI-c), each of which bears at least two (in this instance two) hydroxyl functions in the meta position relative to one another.

It is noted, in the case of an aromatic polyphenol comprising at least one aromatic ring in accordance with formula VI-b, that the two positions ortho to each hydroxyl function of at least one aromatic ring are unsubstituted. In the case of an aromatic polyphenol comprising several aromatic rings in accordance with formula VI-b, the two positions ortho to each hydroxyl function of each aromatic ring are unsubstituted.

According to one embodiment of the invention, the aromatic polyphenol is selected from the group consisting of resorcinol (IV), phloroglucinol (V), 2,2',4,4'-tetrahydroxydiphenyl sulfide (VII), 2,2',4,4'-tetrahydroxybenzophenone (VIII) and the mixtures of these compounds. In a particularly advantageous embodiment, the aromatic polyphenol is phloroglucinol.

In one embodiment, the compound A2) comprises a pre-condensed resin based on the aromatic polyphenol as described in any one of these embodiments.

This pre-condensed resin is advantageously based:
on at least one aromatic polyphenol as defined above, and preferentially selected from the group consisting of resorcinol (IV), phloroglucinol (V), 2,2',4,4'-tetrahydroxydiphenyl sulfide (VII), 2,2',4,4'-tetrahydroxybenzophenone (VIII) and the mixtures thereof; and
on at least one compound capable of reacting with said aromatic polyphenol comprising at least one aldehyde function and/or at least one compound capable of reacting with said aromatic polyphenol comprising at least two hydroxymethyl functions borne by an aromatic ring.

The compound capable of reacting with said aromatic polyphenol may be an aromatic compound as defined above in paragraph I.1, a compound of formula Ar—(CHO)$_2$, in which Ar is as defined above for the aromatic compound of paragraph I.1, or any other aldehyde. Advantageously, said compound is selected from the group consisting of an aromatic compound comprising an aromatic ring bearing at least two functions, one of these functions being a hydroxymethyl function, the other being an aldehyde function or a hydroxymethyl function, formaldehyde, furfuraldehyde, 2,5-furandicarboxaldehyde, 1,4-benzenedicarboxaldehyde, 1,3-benzenedicarboxaldehyde, 1,2-benzenedicarboxaldehyde and mixtures of these compounds. Very advantageously, when the compound is an aromatic compound comprising an aromatic ring bearing at least two functions, one of these functions being a hydroxymethyl function, the other being an aldehyde function or a hydroxymethyl function, this compound is selected from the group consisting of 5-(hydroxymethyl)furfural, 2,5-di(hydroxymethyl)furan and mixtures of these compounds.

Thus, in the pre-condensed resin based on aromatic polyphenol, the repeat unit corresponds to the characteristics of the aromatic polyphenol defined above except that at least one of the carbon atoms of the aromatic ring, which was unsubstituted, is connected to another unit.

Irrespective of the compound other than the aromatic polyphenol at the heart of the pre-condensed resin, this pre-condensed resin is devoid of free formaldehyde. Indeed, even in the case in which the pre-condensed resin is based on an aromatic polyphenol as described previously and on formaldehyde, since the formaldehyde has already reacted with the aromatic polyphenol, the pre-condensed resin is devoid of free formaldehyde liable to be able to react with a compound A1 in accordance with the invention in a subsequent step.

The compound A2) may also comprise a mixture of a free aromatic polyphenol molecule and of a pre-condensed resin based on aromatic polyphenol, as described above. In particular, the compound A2) may also comprise a mixture of phloroglucinol and of a pre-condensed resin based on phloroglucinol.

Aromatic Monophenol A2'

The monophenol A2' may be in accordance with two variants. In one variant, the two positions ortho to the hydroxyl function are unsubstituted. In another variant, at least one position ortho to and the position para to the hydroxyl function are unsubstituted.

Advantageously, in the variant in which at least one position ortho to and the position para to the hydroxyl function are unsubstituted, a single ortho position is unsubstituted and the position para to the hydroxyl function is unsubstituted.

Preferably, regardless of the variant, the two positions ortho to the hydroxyl function are unsubstituted. This is intended to mean that the two carbon atoms located on either side of (in the position ortho to) the hydroxylated carbon atom (i.e. which bears the hydroxyl function) just bear a hydrogen atom.

Even more preferentially, the remainder of the aromatic ring is unsubstituted. This is intended to mean that the other carbon atoms of the remainder of the aromatic ring (those other than the carbon atoms bearing hydroxyl functions) just bear a hydrogen atom.

In one embodiment, the aromatic monophenol comprises several six-membered aromatic rings, at least two of which each bear a single hydroxyl function and, for at least one of the hydroxyl functions, the two positions ortho to the hydroxyl function are unsubstituted, or at least one position ortho to and the position para to the hydroxyl function are unsubstituted.

Preferably, the two positions ortho to each hydroxyl function of at least one six-membered aromatic ring are unsubstituted.

Even more preferentially, the two positions ortho to each hydroxyl function of each six-membered aromatic ring are unsubstituted.

Even more preferentially, the remainder of each of the aromatic rings is unsubstituted. This is intended to mean that the other carbon atoms of the remainder of each aromatic ring (those other than the carbon atoms bearing hydroxyl functions or bearing groups that attach the aromatic rings to one another) just bear a hydrogen atom.

Advantageously, the, or each, aromatic ring of the aromatic monophenol is a benzene ring.

Preferably, the aromatic monophenol is selected from the group consisting of phenol, ortho-cresol, meta-cresol, para-cresol, ortho-chlorophenol, meta-chlorophenol, para-chlorophenol, 2-hydroxybenzoic acid, 3-hydroxybenzoic acid, 4-hydroxybenzoic acid, 4-vinylphenol, 4-ethylphenol, 4-isopropylphenol, 4-isobutylphenol, para-coumaric acid, and mixtures of these compounds.

In one embodiment, the compound A2') comprises a pre-condensed resin based on the aromatic monophenol as described in any one of these embodiments.

This pre-condensed resin is advantageously based:
on at least one aromatic monophenol as defined above, and preferentially selected from the group consisting of phenol, ortho-cresol, meta-cresol, para-cresol, ortho-chlorophenol, meta-chlorophenol, para-chlorophenol, 2-hydroxybenzoic acid, 3-hydroxybenzoic acid, 4-hydroxybenzoic acid, 4-vinylphenol, 4-ethylphenol, 4-isopropylphenol, 4-isobutylphenol, para-coumaric acid, and mixtures of these compounds; and
on at least one compound capable of reacting with said aromatic monophenol comprising at least one aldehyde function and/or at least one compound capable of reacting with said aromatic monophenol comprising at least two hydroxymethyl functions borne by an aromatic ring.

The compound capable of reacting with said aromatic monophenol may be an aromatic compound as defined above in paragraph I.1, a compound of formula Ar—$(CHO)_2$, in which Ar is as defined above for the aromatic compound of paragraph I.1, or any other aldehyde. Advantageously, said compound is selected from the group consisting of an aromatic compound comprising an aromatic ring bearing at least two functions, one of these functions being a hydroxymethyl function, the other being an aldehyde function or a hydroxymethyl function, formaldehyde, furfuraldehyde, 2,5-furandicarboxaldehyde, 1,4-benzenedicarboxaldehyde, 1,3-benzenedicarboxaldehyde, 1,2-benzenedicarboxaldehyde and mixtures of these compounds. Very advantageously, when the compound is an aromatic compound comprising an aromatic ring bearing at least two functions, one of these functions being a hydroxymethyl function, the other being an aldehyde function or a hydroxymethyl function, this compound is selected from the group consisting of 5-(hydroxymethyl)furfural, 2,5-di(hydroxymethyl)furan and mixtures of these compounds.

Thus, in the pre-condensed resin based on aromatic monophenol, the repeat unit corresponds to the characteristics of the aromatic monophenol defined above except that at least one of the carbon atoms of the six-membered aromatic ring, which was unsubstituted, is connected to another unit.

Irrespective of the compound other than the aromatic monophenol at the heart of the pre-condensed resin, this pre-condensed resin is devoid of free formaldehyde. Indeed, even in the case in which the pre-condensed resin is based on an aromatic monophenol as described previously and on formaldehyde, since the formaldehyde has already reacted with the aromatic monophenol, the pre-condensed resin is devoid of free formaldehyde liable to be able to react with a compound A1 in accordance with the invention in a subsequent step.

The compound A2') may also comprise a mixture of a free aromatic monophenol molecule and of a pre-condensed resin based on aromatic monophenol, as described above. In particular, the compound A2') may also comprise a mixture of phenol and of a pre-condensed resin based on phenol.

I.3—Unsaturated Elastomer Latex

It is recalled that a latex is a stable dispersion of microparticles of elastomer(s) in suspension in a generally aqueous solution. An elastomer latex is therefore a composition in a liquid state comprising a liquid solvent, generally water, and at least one elastomer or a rubber dispersed in the liquid solvent so as to form an emulsion. Thus, the latex is not a rubber composition which comprises a matrix of elastomer or of rubber in which at least one other component is dispersed. A rubber composition is in a plastic state in the uncured (non-crosslinked) state and in an elastic state in the cured (crosslinked) state, but never in a liquid state, unlike a latex.

In one embodiment, the composition according to the invention does not comprise any latex.

In another embodiment, the composition according to the invention comprises latex.

Unsaturated (that is to say, bearing carbon-carbon double bonds) elastomer latices, especially diene elastomer latices, are well known to those skilled in the art. They especially form the elastomeric base of the resorcinol/formaldehyde latex "RFL" adhesives described, for example, in U.S. Pat. Nos. 2,561,215 and 3,817,778.

In accordance with the invention, the unsaturated elastomer of the latex is preferentially a diene elastomer, more preferentially a diene elastomer selected from the group consisting of polybutadienes, butadiene copolymers, polyisoprenes, isoprene copolymers and the mixtures of these elastomers. It is more preferentially still selected from the group consisting of butadiene copolymers, vinylpyridine/styrene/butadiene terpolymers, natural rubber and the mixtures of these elastomers.

In a particular embodiment, the composition according to the invention comprises less than 16% (value excluded) by weight of unsaturated diene elastomer latex. Percentage by weight of the composition is understood as the percentage by weight of the total composition, that is to say weight of latex to weight of dry constituents plus weight of water.

Preferably, the composition comprises at most 10%, preferably at most 5%, and more preferentially at most 1% by weight of unsaturated diene elastomer latex.

I.4—Aqueous Adhesive Solution Comprising a Pre-Condensed Resin of the Invention

Another subject of the invention is an aqueous adhesive solution comprising a pre-condensed resin based on:

A1) at least one aromatic compound bearing at least two functions, one of these functions being a hydroxymethyl function and the other being an aldehyde function or a hydroxymethyl function, the aromatic compound comprising at least one aromatic ring; and A2) at least one aromatic polyphenol comprising at least one aromatic ring bearing at least two hydroxyl functions in the meta position relative to one another, the two positions ortho to at least one of the hydroxyl functions being unsubstituted.

Advantageously, the pre-condensed resin according to the invention is also based on:

A2') at least one aromatic monophenol comprising at least one six-membered aromatic ring bearing a single hydroxyl function,
  the two positions ortho to the hydroxyl function being unsubstituted, or
  at least one position ortho to and the position para to the hydroxyl function being unsubstituted.

The aromatic compound is as described above; in particular it is a compound of formula (I) as defined above.

The aromatic polyphenol and/or the aromatic monophenol is as described above; in particular, it is preferentially an aromatic polyphenol and/or an aromatic monophenol which is a single molecule.

N1 is defined as the number of reactive sites on the aromatic compound, as follows: an aldehyde function represents two reactive sites and a hydroxymethyl function represents one reactive site. Thus, for example, 5-(hydroxymethyl)furfural has N1=3 reactive sites and 2,5-di (hydroxymethyl)furan has N1=2 reactive sites.

In the case of an aromatic polyphenol, N2 is defined as the number of reactive sites of the aromatic polyphenol, as follows: each free carbon on the aromatic ring adjacent to a hydroxyl function borne by the aromatic ring represents a reactive site, each free carbon only being able to be counted as a reactive site for a single adjacent hydroxyl function. Thus, for example, resorcinol and phloroglucinol each have N2=3 reactive sites and 2,2',4,4'-tetrahydroxydiphenyl sulfide has N2=4 reactive sites.

In the case of an aromatic monophenol, N'2 is defined as the number of reactive sites of the aromatic monophenol, as follows: each free carbon on the six-membered aromatic ring adjacent to the hydroxyl function borne by the aromatic ring represents a reactive site, and the free carbon of the six-membered aromatic ring positioned para to the hydroxyl function represents a reactive site. Thus, for example, phenol has N'2=3 reactive sites.

The pre-condensed resin is obtained by mixing:
  the aromatic compound A1); and
  the aromatic polyphenol A2); and optionally
  the aromatic monophenol A2');
in a basic solvent preferably having a pH of between 8 and 13, more preferentially between 9 and 12, or in an acidic or neutral solvent preferably having a pH of between 4 and 7 and more preferentially between 5 and 7.

The pre-condensed resin is advantageously prepared by gradually mixing the aromatic polyphenol and/or the aromatic monophenol and the aromatic compound A1 in an aqueous solution.

In a first variant, the components on which the pre-condensed resin is based are mixed in a basic solvent, such as an aqueous sodium hydroxide solution, preferably having a pH of between 8 and 13, more preferentially between 9 and 12.

In a second variant, the components on which the pre-condensed resin is based are mixed in an acidic or neutral solvent such as an aqueous solution having a pH of between 4 and 7, preferably between 5 and 7.

In some cases, for example at relatively high concentrations or in the case of an acidic solvent, those skilled in the art may find cause to add a thickener, for example carboxymethyl cellulose, or a gelling agent, for example a gelatin, in order to limit sedimentation of the pre-condensed resin.

Regardless of the variant, the combined constituents are mixed with stirring for a time which may vary depending on the temperature used and the specific composition targeted, for example for a period of time which may vary between 1 min and 6 h, at a temperature of between 20° C. and 90° C., preferentially between 20° C. and 60° C.

In the first variant, an acid is advantageously subsequently added so as to neutralize the base and to obtain a pre-condensed resin that can be stored and used subsequently.

In the second variant, a base is advantageously subsequently added so as to neutralize the acid and to obtain a pre-condensed resin that can be stored and used subsequently.

In order to prepare the pre-condensed resin, the molar amount n2 of aromatic polyphenol A2, the molar amount n'2 of aromatic monophenol AZ and the molar amount n1 of the aromatic compound A1 are such that $[(n2*N2)+(n'2*N'2)]/(n1*N1)>1$, preferably $1<[(n2*N2)+)+(n'2*N'2)]/(n1*N1)<5$.

The pre-condensed resin is subsequently generally diluted in water.

I.5—Additives—Manufacture of the Aqueous Adhesive Composition

The aqueous adhesive composition in accordance with the invention may of course comprise all or some of the additives customary for aqueous adhesive compositions, such as those used in conventional phenolic resin adhesives; mention will be made, for example, of bases such as aqueous ammonia, sodium, potassium or ammonium hydroxide, dyes, fillers such as carbon black or silica, antioxidants or other stabilizers, thickeners, for example carboxymethyl cellulose, or gelling agents, for example a gelatin, making it possible to increase the viscosity of the composition. Mention will also be made of additives that make it possible to modify the setting or gelling time and the open time of the resin. As is known to those skilled in the art, the setting or gelling time is the length of time for which it is possible to apply the resin to its substrate and the open time is the length of time for which, after application of the resin to its substrate, it is possible to leave the resin in the open air without adversely affecting the quality of the subsequent adhesive bond with the complementary substrate. The setting time or gelling time and the open time are especially dependent on the temperature, pressure or else the resin concentration.

Typically, during a first resinification step, the constituents of the thermosetting resin itself are mixed, advantageously in water.

This first resinification step may be carried out according to several embodiments.

Before describing in detail the different embodiments, it will firstly be specified that the thermosetting resin of the aqueous adhesive composition may be obtained by mixing the constituents of the resin, that is to say said compound A1) as defined above, said aromatic compound A2) as defined above and optionally said compound A2') as defined above, in a solvent that is either basic, preferably having a pH of between 8 and 13, more preferentially between 9 and 12, or acidic or neutral, preferably having a pH of between 4 and 7, more preferentially between 5 and 7. This solvent is advantageously water that has been rendered basic by addition of a base or rendered acidic by the addition of an acid.

In a first embodiment, use is made of a pre-condensed resin based on aromatic polyphenol as defined in paragraph I.2, that is to say based:
- on at least one aromatic polyphenol comprising at least one aromatic ring bearing at least two hydroxyl functions in the meta position relative to one another, the two positions ortho to at least one of the hydroxyl functions being unsubstituted; and
- on at least one compound capable of reacting with said aromatic polyphenol comprising at least one aldehyde function and/or at least one compound capable of reacting with said aromatic polyphenol comprising at least two hydroxymethyl functions borne by an aromatic ring.

The pre-condensed resin based on aromatic polyphenol A2 is advantageously prepared by gradually mixing the aromatic polyphenol and the compound comprising at least one aldehyde function and/or the compound comprising at least two hydroxymethyl functions borne by an aromatic ring, for example formaldehyde, in molar amounts as described above.

In a first variant, the components on which the pre-condensed resin is based are mixed in a basic solvent, such as an aqueous sodium hydroxide solution, preferably having a pH of between 8 and 13, more preferentially between 9 and 12.

Thus, the pre-condensed resin is obtained by mixing:
said aromatic polyphenol, and
said compound capable of reacting with said aromatic polyphenol,
in a basic solvent preferably having a pH of between 8 and 13 and more preferentially between 9 and 12.

In a second variant, the components on which the pre-condensed resin is based are mixed in an acidic or neutral solvent such as an aqueous solution having a pH of between 4 and 7, preferably between 5 and 7.

Thus, pre-condensed resin is obtained by mixing:
said aromatic polyphenol, and
said compound capable of reacting with said aromatic polyphenol,
in an acidic or neutral solvent preferably having a pH of between 4 and 7 and more preferentially between 5 and 7.

In some cases, for example at relatively high concentrations or in the case of an acidic solvent, those skilled in the art may find cause to add a thickener, for example carboxymethyl cellulose, or a gelling agent, for example a gelatin, in order to limit sedimentation of the pre-condensed resin.

Regardless of the variant, the combined constituents are mixed with stirring for a time which may vary depending on the temperature used and the specific composition targeted, for example for a period of time which may vary between 1 min and 6 h, at a temperature of between 20° C. and 90° C., preferentially between 20° C. and 60° C.

As described above, it is advantageously possible to neutralize the medium so as to obtain a pre-condensed resin that can be stored and used subsequently.

Then, in this first embodiment, the adhesive composition may be obtained by mixing:
this pre-condensed resin (compound A2), and
the aromatic compound A1,
in a basic solvent preferably having a pH of between 8 and 13, more preferentially between 9 and 12, or in an acidic or neutral solvent preferably having a pH of between 4 and 7 and more preferentially between 5 and 7.

In particular, this pre-condensed resin based on aromatic polyphenol (compound A2) is mixed gradually with the aromatic compound A1 in a basic solvent such as an aqueous sodium hydroxide solution, preferably having a pH of between 8 and 13, more preferentially between 9 and 12, or else in an acidic or neutral solvent such as an aqueous solution having a pH of between 4 and 7, preferably between 5 and 7. Regardless of whether it is in acidic or basic medium, all the constituents are mixed with stirring for a length of time which may vary depending on the temperature used and the specific composition targeted, for example for a duration which may vary between 1 min and 6 h, at a temperature of between 20° C. and 90° C., preferentially between 20 and 60° C. Those skilled in the art will know how to adjust the molar amounts of the pre-condensed resin based on aromatic polyphenol A2 and on the aromatic compound A1 in order to obtain crosslinking and a concentration suitable for the desired use, especially as a function of the nature of the pre-condensed resin based on aromatic polyphenol A2.

In a second embodiment, use is made of a pre-condensed resin as described in paragraph I-4, that is to say based on:
A1) at least one aromatic compound bearing at least two functions, one of these functions being a hydroxymethyl function and the other being an aldehyde function or a hydroxymethyl function, the aromatic compound comprising at least one aromatic ring, for example 5-(hydroxymethyl)furfural, and
A2) at least one aromatic polyphenol comprising at least one aromatic ring bearing at least two hydroxyl functions in the meta position relative to one another, the two positions ortho to at least one of the hydroxyl functions being unsubstituted, for example phloroglucinol.

In this second embodiment, the pre-condensed resin based on aromatic polyphenol in accordance with the invention is prepared under conditions analogous to the pre-condensed resin based on aromatic polyphenol of the first embodiment. Then, this pre-condensed resin based on aromatic polyphenol according to the invention A2 is gradually mixed with the aromatic compound A1 under conditions analogous to those of the first embodiment. Here too, those skilled in the art will know how to adjust the molar amounts of pre-condensed resin based on aromatic polyphenol A2 and on the aromatic compound A1 in order to obtain crosslinking and a concentration suitable for the desired use, especially as a function of the nature of the pre-condensed resin based on aromatic polyphenol A2.

In a third embodiment, use is made of an aromatic polyphenol A2 according to the invention in the form of a single molecule, for example phloroglucinol.

In a first variant, the thermosetting resin is obtained by:
mixing the aromatic polyphenol A2) in the form of a single molecule in a basic solvent preferably having a pH of between 8 and 13, more preferentially between 9 and 12, or in an acidic or neutral solvent preferably having a pH of between 4 and 7, more preferentially between 5 and 7,
then addition of the aromatic compound A1).

In particular, the aromatic polyphenol A2 is firstly mixed in a basic solvent such as an aqueous sodium hydroxide solution, preferably having a pH of between 8 and 13, more preferentially between 9 and 12, or else in an acidic or neutral solvent such as an aqueous solution having a pH of between 4 and 7, preferably between 5 and 7.

In some cases, for example at relatively high concentrations or in the case of an acidic solvent, those skilled in the art may find cause to add a thickener, for example carboxymethyl cellulose, or a gelling agent, for example a gelatin, in order to limit sedimentation of the aromatic polyphenol A2.

Then, the aromatic compound A1) is added. In particular, the aromatic compound A1 is gradually added under conditions analogous to those of the first embodiment.

In a second variant, the thermosetting resin is obtained by:
mixing the aromatic compound A1) in a basic solvent preferably having a pH of between 8 and 13, more preferentially between 9 and 12, or in an acidic or neutral solvent preferably having a pH of between 4 and 7 and more preferentially between 5 and 7,
then adding the aromatic polyphenol A2) in the form of a single molecule.

In particular, the aromatic compound A1 is firstly mixed in an aqueous solution, preferably in a basic solvent, such as an aqueous sodium hydroxide solution, preferably having a pH of between 8 and 13, more preferentially between 9 and 12. Then, the aromatic polyphenol A2 is added and the components are mixed under conditions analogous to those of the first embodiment.

This third embodiment is particularly advantageous compared to the first and second embodiments since it makes it possible to obtain a greater gelling time or setting time for the adhesive composition.

A molar amount n2 of aromatic polyphenol A2 and a molar amount n1 of the aromatic compound A1 are mixed such that $0.3 \leq (n2*N12)/(n1*N1) \leq 3$, and preferably $1 < (n2*N2)/(n1*N1) \leq 2$.

In each of the three preceding embodiments, the aromatic polyphenol could be partially replaced by an aromatic monophenol comprising at least one six-membered aromatic ring bearing a single hydroxyl function, the two positions ortho to the hydroxyl function being unsubstituted, or at least one position ortho to and the position para to the hydroxyl function being unsubstituted.

In this case, in the third embodiment described above, in which use is made of compounds in the form of single molecules, a molar amount n2 of aromatic polyphenol A2 and/or a molar amount n'2 of aromatic monophenol A2' and a molar amount n1 of the aromatic compound A1 would then be mixed such that $0.3 \leq [(n2*N2)+(n'2*N'2)]/(n1*N1) \leq 3$, and preferably $1 < [(n2*N2)+(n'2*N'2)]/(n1*N1) \leq 2$.

In any one of these three embodiments, the aqueous adhesive composition of the invention is subsequently obtained directly, or the partially crosslinked thermosetting resin is diluted in water to form the aqueous adhesive composition of the invention.

For example, the constituents of the adhesive composition are added in the following order: the water, possible water-soluble additives (for example aqueous ammonia), and the partially crosslinked thermosetting resin (diluted). The combination is mixed with stirring for 1 to 30 min, for example at 20° C.

When the aqueous adhesive composition of the invention also contains a latex, the partially crosslinked thermosetting resin is generally diluted in water before being added to the unsaturated elastomer latex or latices (if there are several), according to a general procedure which is well known to those skilled in the art. The constituents of the adhesive composition are advantageously added in the following order: the water, possible water-soluble additives (for example aqueous ammonia), the latex or latices (any order) and the partially crosslinked thermosetting resin (diluted). The combination is mixed with stirring for 1 to 30 min, for example at 20° C.

Preferably, during this step of forming the aqueous adhesive composition, it will be ensured that the aqueous adhesive composition has a pH of between 8 and 13, more preferentially between 9 and 12, so as to limit any potential precipitation of the, or of some, unsaturated elastomer latex (latices).

Thus, in the event that, during the resinification step preceding this step of forming the aqueous adhesive composition, use was made of an acidic or neutral solvent or a basic solvent which was neutralised, a base will be added that makes it possible to obtain a pH of between 8 and 13, more preferentially between 9 and 12, prior to the addition of the unsaturated elastomer latex (latices), so as to limit any potential precipitation of the, or of some, unsaturated elastomer latex (latices).

The concentration of the composition may be adjusted as a function of its specific use (open time, viscosity).

In a first embodiment, the final adhesive composition thus prepared has a total solids content, advantageously a solids content of thermosetting resin, of between 5 and 70%, more preferentially between 10 and 50% by weight.

In a second embodiment, the final adhesive composition thus prepared has a total solids content, advantageously a solids content of thermosetting resin of between 20 and 80%, more preferentially between 30 and 70% by weight.

"Total solids content of the adhesive composition" is intended to mean the ratio of the weight of residue obtained after drying the adhesive composition to the weight of adhesive composition before drying.

"Solids content of the thermosetting resin" is intended to mean the ratio of the weight of thermosetting resin obtained after drying the adhesive composition to the weight of adhesive composition before drying.

These two solids contents are measured in accordance with standard NF EN 827 (March 2006).

The composition will be able to be used immediately, or else stored at ambient temperature (23° C.) for a maturing time which may typically vary from one to several hours or even several days, before the final use thereof.

In a first embodiment, the water content of the aqueous adhesive composition of the invention is preferably between 60 and 90% by weight, more preferentially between 60 and 85% by weight.

In a second embodiment, the water content of the aqueous adhesive composition of the invention is preferably between 20 and 80% by weight, more preferentially between 30 and 70% by weight.

"Water content of the aqueous adhesive composition" is intended to mean the weight of water relative to the total weight of the adhesive composition.

II—ADHESIVELY BONDED ASSEMBLY OF THE INVENTION

II.1—Definitions; Examples

As indicated above, the present invention also relates to the use of the aqueous adhesive composition described above for the adhesive bonding of two elements.

Thus, an adhesively bonded assembly of two elements according to the invention comprises a layer of the aqueous adhesive composition as described above joining the two elements to one another.

In one embodiment, these two elements are made of wood.

Wood is intended to mean the plant tissue resulting from ligneous plants. Examples of plant tissue are the trunk, branches and roots. For example, the ligneous plants from which the plant tissue results are oak, chestnut, ash, walnut, beech, poplar, fir, pine, olive, alder or birch.

It is also possible to use the adhesive for the adhesive bonding of elements made from materials other than wood, for example plastic materials, for example thermosetting or thermoplastic materials, textiles, mineral materials or mixtures of these materials, including with wood.

Element is intended to mean any monolithic piece or particle. Examples of elements made of wood are plies intended to form a plywood assembly, lathwork intended to form a lathed assembly, particles, such as chips, sawdust, flour or flakes, in order to form a chipboard assembly, whether or not the particles are oriented, fibres intended to form an assembly of fibres, such as a high- or medium-density panel, pieces of solid wood, also known as timber, intended to form assemblies, such as furniture or frames.

II.2—Manufacture of the Adhesively Bonded Assembly

The adhesively bonded assembly of the invention may be prepared according to a process for adhesively bonding two elements wherein:
 a layer of the aqueous adhesive composition as defined above is applied to at least one of the two elements, and the two elements are joined to one another via the layer of the aqueous adhesive composition.

The step of application of the adhesive composition to one, or the, elements may be carried out according to any suitable method, especially by any known coating technique, such as, for example, spraying, impregnation or injection under pressure or else by a combination of one or more of these techniques.

Use may preferentially be made of a content of aqueous adhesive composition ranging from 70 to 350 $gr.m^{-2}$.

After the step of application of the adhesive composition, the adhesively bonded assembly is heated at a temperature ranging from 30° C. to 200° C., preferably from 80° C. to 160° C. depending on the targeted applications. The aim of this heat treatment is to eliminate any solvent or water and to crosslink the thermosetting resin. Depending on the fields of application, the heat treatment may be carried out in two stages: a first heat treatment with the aim of eliminating any solvent or water, and a second heat treatment with the aim of finishing the crosslinking of the thermosetting resin.

Preferably, the adhesively bonded assembly is kept under pressure, for example under a pressure ranging up to 18 $kg \cdot cm^{-2}$. More preferentially, the step of keeping under pressure is carried out simultaneously with the heating step.

The duration of the step of heating and/or keeping under pressure varies from a few minutes to a few hours depending on the circumstances, especially according to the temperature/pressure pair used.

In one embodiment, the two elements to be assembled are made of wood.

Where appropriate, those skilled in the art will know how to adjust the temperature and the duration of the heat treatment above according to the particular operating conditions of the invention, especially according to the exact nature of the element. In particular, those skilled in the art will have the advantage of scanning the treatment temperatures and times so as to search, by successive approximations, for the operating conditions leading to the best adhesion results, for each particular embodiment of the invention.

III—EXEMPLARY EMBODIMENTS OF THE INVENTION AND COMPARATIVE TESTS

These tests demonstrate that the adhesive bonding of two elements made of wood with an aqueous adhesive composition according to the invention is equivalent, or even in some cases improved, in comparison with adhesive bondings with a conventional adhesive composition.

For this, four aqueous adhesive compositions were prepared, two in accordance with the invention (hereinafter denoted C-3 and C-4) and two not in accordance with the invention (control compositions, hereinafter denoted C-1 and C-2). Their formulations (expressed as percentage by weight) are presented in the appended Table 1. The amounts listed in this table are those of the constituents in the dry state, with respect to a total of 100 parts by weight of aqueous adhesive composition (that is to say, the constituents and the water).

The adhesive composition C-1 is a control composition based on formaldehyde and on a pre-condensed resorcinol/formaldehyde resin.

The adhesive composition C-2 is a control composition based on formaldehyde and phloroglucinol.

The composition C-3 is an aqueous adhesive composition according to the invention based on 5-(hydroxymethyl) furfural and on a pre-condensed resorcinol/formaldehyde resin.

The composition C-4 is an aqueous adhesive composition according to the invention based on 5-(hydroxymethyl) furfural and on phloroglucinol.

Protocol for Producing the Aqueous Adhesive Composition

Water and sodium hydroxide are weighed into a 250 ml round-bottomed flask equipped with a mechanical stirring system. Stirring is carried out in order to homogenize (for example at 250 rpm). The aromatic polyphenol (for example phloroglucinol or SRF 1524 resin) is subsequently added. The solution is left until it becomes homogeneous then the aromatic compound (for example formaldehyde or HMF (5-hydroxymethylfurfural)) is added. Stirring is carried out for between 5 and 15 minutes, depending on the constituents added (which those skilled in the art will know how to determine), at ambient temperature. At the end of this time, the aqueous adhesive composition is ready to be used.

Protocol for Producing the Test Specimen

Each test specimen comprises two elements made of wood, in this instance beech wood with a density equal to 0.83 g·cm$^{-3}$, each having a parallelpipedal general form of dimensions 70 cm×25 mm×3 mm. At each end of the elements, a layer of the aqueous adhesive composition is applied over the whole width of the element, in this case 25 mm, and over a length of 1 cm. The two elements are then joined via the layers of composition applied to each wooden element. The total surface area coated with adhesive of each wooden element is therefore 5 cm$^2$ Once joined, the surface area coated with adhesive of the test specimen formed by the two wooden elements is now only 2.5 cm$^2$. Depending on the formulations, it is possible to coat just 1 of the 2 wooden elements with adhesive and to produce the test specimen using 1 wooden element coated with adhesive and 1 wooden element not coated with adhesive. The test specimen not coated with adhesive will then be placed in contact with the test specimen coated with adhesive. The test specimen thus formed may be cured using different curing conditions that those skilled in the art will know how to adapt as a function of their requirements, for example for 5 minutes at 140° C.

On conclusion of the curing, the test specimen, thus consisting of the two elements joined by adhesive bonding, is placed between the jaws of a suitable tensile testing machine, then placed under tension at a given rate and a given temperature (for example, in the present case, at 10 mm/min and 20° C.).

The adhesion levels are characterized by measuring the "tearing-out" force (denoted by $F_{max}$) for separating the two elements from one another by breaking the adhesively bonded layer. A value greater than that for the control test specimen, arbitrarily set at 100, indicates an improved result, that is to say, a greater tearing-out force than that for the control test specimen.

The aqueous adhesive compositions according to the invention C-3 and C-4, devoid of formaldehyde, have a tearing-out force that is similar to, or even greater than the control compositions C-1 and C-2.

Thus, the aqueous adhesive compositions according to the invention constitute a highly advantageous alternative to the use of the adhesive compositions of the prior art.

TABLE 1

| Adhesive compositions | C-1 | C-2 | C-3 | C-4 |
|---|---|---|---|---|
| Compound: | | | | |
| Formaldehyde (1) | 27.3 | 34.3 | — | — |
| 5-(hydroxymethyl)furfural (2) | — | — | 25.1 | 30 |
| Polyphenol: | | | | |
| Phloroglucinol (3) | — | 26.7 | — | 26.7 |
| SRF 1524 (4) | 39 | — | 41.1 | — |
| Sodium hydroxide (5) | 2.3 | 2.3 | 2.3 | 2.3 |
| Total weight of solids of adhesive composition | 78.6 | 73.3 | 78.5 | 59 |
| Weight of water | 31.4 | 36.7 | 31.5 | 41 |
| Adhesion tests | | | | |
| $F_{max}$ at 20° C. | 100 | 85 | 105 | 100 |

(1) Formaldehyde (from Caldic; diluted to 36%);
(2) HMF (from Aldrich; purity of >99%);
(3) Phloroglucinol (from Alfa Aesar; purity of 99%);
(4) Pre-condensed resin SRF 1524 (from Schenectady; diluted to 75%);
(5) Sodium hydroxide (from Aldrich; diluted to 30%).

The invention claimed is:

1. An aqueous adhesive composition comprising a thermosetting resin based on:
    (A1) at least one aromatic compound comprising at least one aromatic ring bearing at least two functions, one of these functions being a hydroxymethyl function and the other being an aldehyde function or a hydroxymethyl function; and
    (A2) at least one aromatic polyphenol comprising:
    at least one aromatic ring bearing three hydroxyl functions in the meta position relative to one another, wherein, for at least one of the hydroxyl functions, the two positions ortho to the hydroxyl functions are unsubstituted; or
    several aromatic rings, at least two of these each bearing at least two hydroxyl functions in the meta position relative to one another, wherein, for at least one of the hydroxyl functions of at least one aromatic ring, the two positions ortho to the hydroxyl function are unsubstituted.

2. The composition according to claim 1, wherein the thermosetting resin is also based on:
    (A2') at least one aromatic monophenol comprising at least one six-membered aromatic ring bearing a single hydroxyl function, the two positions ortho to the hydroxyl function being unsubstituted, or at least one position ortho to and the position para to the hydroxyl function being unsubstituted.

3. The composition according to claim 1, wherein the aromatic compound A1 corresponds to the general formula (II):

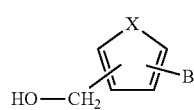

(II)

in which B represents CHO or CH$_2$OH, X represents O, NR$_1$, NO, S, SO, SO$_2$, SR$_2$R$_3$, R$_1$ represents a hydrogen, an alkyl, aryl, arylalkyl, alkylaryl or cycloalkyl group, $R_2$, $R_3$ each represent, independently of one another, a hydrogen, an alkyl, aryl, arylalkyl, alkylaryl or cycloalkyl group.

4. The composition according to claim 1, wherein the aromatic compound A1 corresponds to the general formula (II'a1) or (II'a2):

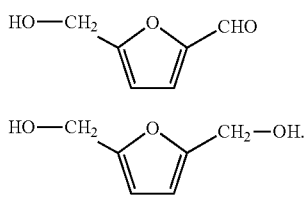

5. The composition according to claim 1, wherein the aromatic ring of the aromatic polyphenol bears three hydroxyl functions in the meta position relative to one another.

6. The composition according to claim 1, wherein the two positions ortho to each hydroxyl function on the aromatic ring of the aromatic polyphenol are unsubstituted.

7. The composition according to claim 1, wherein the remainder of the aromatic ring of the aromatic polyphenol is unsubstituted.

8. The composition according to claim 1, wherein the aromatic polyphenol comprises several aromatic rings, at least two of these each bearing at least two hydroxyl functions in the meta position relative to one another, wherein, for at least one of the hydroxyl functions of at least one aromatic ring, the two positions ortho to the hydroxyl function are unsubstituted.

9. The composition according to claim 8, wherein at least one of the aromatic rings of the aromatic polyphenol bears three hydroxyl functions in the meta position relative to one another.

10. The composition according to claim 8, wherein the two positions ortho to each hydroxyl function of at least one aromatic ring of the aromatic polyphenol are unsubstituted.

11. The composition according to claim 8, wherein the two positions ortho to each hydroxyl function of each aromatic ring of the aromatic polyphenol are unsubstituted.

12. The composition according to claim 1, wherein each aromatic ring of the aromatic polyphenol is a benzene ring.

13. The composition according to claim 1, wherein the aromatic polyphenol is selected from the group consisting of phloroglucinol, 2,2',4,4'-tetrahydroxydiphenyl sulfide, 2,2', 4,4'-tetrahydroxybenzophenone and mixtures thereof.

14. The composition according to claim 1, wherein the aromatic polyphenol is a pre-condensed resin based on:
at least one aromatic polyphenol comprising:
at least one aromatic ring bearing three hydroxyl functions in the meta position relative to one another, wherein, for at least one of the hydroxyl functions, the two positions ortho to the hydroxyl functions are unsubstituted, or
several aromatic rings, at least two of these each bearing at least two hydroxyl functions in the meta position relative to one another, wherein, for at least one of the hydroxyl functions of at least one aromatic ring, the two positions the hydroxyl function are unsubstituted; and
at least one compound capable of reacting with said aromatic polyphenol comprising at least one aldehyde function and/or a compound capable of reacting with said aromatic polyphenol comprising at least two hydroxymethyl functions borne by an aromatic ring.

15. The composition according to claim 1, wherein the water content of the aqueous adhesive composition is between 20 and 80% by weight.

16. The composition according to claim 1, wherein the total solids content of the aqueous adhesive composition is between 20 and 80% by weight.

17. An aqueous adhesive solution comprising a pre-condensed thermosetting resin based on:
(A1) at least one aromatic compound comprising at least one aromatic ring bearing at least two functions, one of these functions being a hydroxymethyl function and the other being an aldehyde function or a hydroxymethyl function; and
(A2) at least one aromatic polyphenol comprising:
at least one aromatic ring bearing three hydroxyl functions in the meta position relative to one another, wherein, for at least one of the hydroxyl functions, the two positions ortho to the hydroxyl function are unsubstituted, or
several aromatic rings, at least two of these each bearing at least two hydroxyl functions in the meta position relative to one another, wherein, for at least one of the hydroxyl functions of at least one aromatic ring, the two positions ortho to the hydroxyl function are unsubstituted.

18. The aqueous adhesive solution according to claim 17, wherein the thermosetting resin is also based on:
(A2') at least one aromatic monophenol comprising at least one six-membered aromatic ring bearing a single hydroxyl function, the two positions ortho to the hydroxyl function being unsubstituted, or at least one position ortho to and the position para to the hydroxyl function being unsubstituted.

19. A process for adhesively bonding two elements comprising the steps of:
applying a layer of the aqueous adhesive composition according to claim 1 to at least one of the two elements, and
joining the two elements to one another via the layer of the aqueous adhesive composition.

20. An adhesively bonded assembly of two elements comprising a layer of the aqueous adhesive composition according to claim 1 joining the two elements to one another.

21. The composition according to claim 1, wherein the aromatic polyphenol is phloroglucinol.

* * * * *